United States Patent [19]
Knabe et al.

[11] Patent Number: 4,566,730
[45] Date of Patent: Jan. 28, 1986

[54] SLIDING ROOF FOR VEHICLES

[75] Inventors: Martin Knabe, Berlin; Wolfgang Anzenhofer, Olching, both of Fed. Rep. of Germany

[73] Assignee: Webasto-Werk W. Baier GmbH & Co., Fed. Rep. of Germany

[21] Appl. No.: 530,716

[22] Filed: Sep. 9, 1983

[30] Foreign Application Priority Data

Oct. 16, 1982 [DE] Fed. Rep. of Germany ....... 3238454

[51] Int. Cl.⁴ ................................................. B60J 7/00
[52] U.S. Cl. .................... 296/221; 296/222; 296/223
[58] Field of Search ............................... 296/221–223, 296/216, 224

[56] References Cited

U.S. PATENT DOCUMENTS

| | | | |
|---|---|---|---|
| 3,572,822 | 3/1971 | Schmid | 296/221 |
| 4,403,805 | 9/1983 | Strem, Jr. et al. | 296/221 |
| 4,420,184 | 12/1983 | Kaltz | 296/223 |

*Primary Examiner*—David A. Scherbel
*Assistant Examiner*—Dennis H. Pedder
*Attorney, Agent, or Firm*—Sixbey, Friedman & Leedom

[57] ABSTRACT

A sliding/lifting roof for motor vehicles having a cover closing an opening in the roof in its closed position and, at both longitudinal sides of the opening in the roof, being guided in a slideable manner, by means of a respective guiding member in a longitudinal guide. The cover is disposed so that it can be pivoted around a swivel axis extending transversely, is connected, via a tilt-out mechanism, with a drive member, and, by a sliding of the drive member, can be swung out, while lifting its rear edge, above the roof surface, or is slideable, by lowering its rear edge, under the fixed roof surface. The tilt-out mechanism has a link that is connected with the drive member and a tilt-out lever that engages with the link, with the tilt-out lever being rotatably coupled to the cover and, with respect to the link, being longitudinally movable in the sliding direction of the roof by a certain distance as well as being swingable. The link and the tilt-out lever, via an additional forcing guide, are connected with one another, with the forcing guide, at least in the range of the cover adjustment between the closed position of the cover and the lowered rear edge position of the cover, positively guiding the tilt-out lever into a predetermined swing position with respect to the link for every position of the link with respect to the longitudinal guide, thereby avoiding undesired vertical movements and suppressing the tendency of the cover to vibrate and rattle.

28 Claims, 13 Drawing Figures

SLIDING ROOF FOR VEHICLES

BACKGROUND AND SUMMARY OF THE INVENTION

This invention relates to a sliding/lifting roof for vehicles, especially motor vehicles, having a rigid cover for closing an opening in the roof and which is slidingly guided, in the area of its front edge at both longitudinal sides of the opening of the roof, by means of respective guiding members, each, in a longitudinal guide, being pivotable around a swivel axis extending transversely to the cover-sliding direction and being connected, in an area located at a distance in a rear direction from the front edge of said cover, via a tilt-out mechanism. A drive member, that is adjustable in the cover-sliding direction, enables the cover to, selectively, be either swung out of the roof opening by lifting its rear edge above the fixed roof surface, or slid, after lowering its rear edge, below a fixed rear roof surface, in which case the tilt-out mechanism has a link that is adjustable jointly with said drive member, and has a tilt-out lever that engages with said link, with said tilt-out lever being pivoted at said cover so that it rotates around a shaft fixed at said cover, and relative to said link being longitudinally movable and also swingable for a certain distance in the sliding direction of said cover.

In case of a known sliding/lifting roof of this type (DE-PS No. 19 19 479), the tilt-out lever, at the end away from the cover, has a pin which is longitudinally slideable in a linear guide slot of the link and can be rotated freely in any position. The link itself, via a joint-parallelogram-type elevating device, is connected with a transport bridge forming the drive member, by means of which elevating device the cover, with its rear edge, can be changed from the lowered position into the closed position in order to then, if desired, be tilted out via the tilt-out lever by sliding of the link. The known tilt-out mechanism consists of many parts. The sliding-/lifting roof provided with this tilt-out mechanism is subject to vibrations and rattling noises unless relatively expensive additional measures are taken.

The invention is based on the objective of creating a sliding/lifting roof of the initially-mentioned type that requires few component parts and guarantees an especially secure and stable guiding of the cover with a suppression of the tendency to vibrate and rattle.

According to the invention, this objective is achieved in that the link and the tilt-out lever, via an additional forcing guide, are connected with one another, with said forcing guide, at least in the range of the cover adjustment, between the closed position of the cover and the lowered rear edge of the cover, forcing said tilt-out lever for each position of the link with respect to the longitudinal guidance into a predetermined swivel position with respect to the link.

This measure ensures an exact coordination between the movement of the link and the swivel movement of the tilt-out lever. Uncontrolled movements of the cover, especially also vibrating movements, are effectively prevented.

In a further development of the invention, the tilt-out lever, via an additional forcing guide, can be forced to carry out a swivel movement, with respect to the link, that takes along the rear edge of the cover into the lowered position.

The additional forcing guide, in the displacement range corresponding to the closed position of the cover, preferably has an idle range, during the passage of which the swivel position of the tilt-out lever, with respect to the link, is kept constant irrespective of a longitudinal movement of the link. In the case of a motor drive of the sliding/lifting roof, such an idle range neutralizes an inertia-caused after-running of the drive motor after the switch-off.

The additional forcing guide is advantageously formed by a link pin fastened at the link and engaging in a guide slot of the tilt-out lever, as well as by a cam that is mounted at the tilt-out lever, and can be moved along a cam path of the link. In this manner, a stable three-point connection is obtained between the link and the tilt-out lever in the various relative operational positions. The cam is preferably elastic or is elastically mounted at the tilt-out lever in order to cause the relative movement between the tilt-out lever and the link to take place under a slight initial tension and, therefore, to be free from play. The cam may especially be a roller made of an elastic material or having a layer made of an elastic material, with said roller being rotatably disposed at the tilt-out lever.

For the mutual connection of the link and the tilt-out lever, the link advantageously has a longitudinal slot in which a sliding piece is guided so that it can be slid in the sliding direction of the cover, and the tilt-out lever is linked to said sliding piece. In order to preset the final position of the cover in the swung-out position, the link and the tilt-out lever may have interacting stop faces for limiting the swing-out movement of the tilt-out lever with respect to the link. The link and the tilt-out lever may also, preferably, have complementary cylindrical contact surfaces for guiding the tilt-out lever during the tilting-out process. Thus, the occurring forces may be intercepted on a large area.

In order to avoid an undesired vertical movement of the cover during the sliding movement of the lowered cover to the front or to the rear, it is advantageous to mount a holding-down device on both sides of the cover that interacts with the longitudinal guide, with said holding device, during the tilting-out of the cover, disengaging from the longitudinal guide.

In order to further stabilize the cover, a stop is advantageously provided that goes along with the longitudinal movement of the cover, with said stop, during the tilting-out of the cover, resting against a counter-stop preventing a longitudinal movement of the cover. The stop may be attached to a sealing bridge that can be longitudinally adjusted together with the cover, with said sealing bridge forming a water channel located below the rear edge of the cover and, in the closed position of the cover, being pressable from below against the bottom side of the cover or the fixed rear roof surface, as explained in detail in commonly assigned co-pending U.S. patent application Ser. No. 483,176, U.S. Pat. No. 4,537,442, filed Apr. 8, 1983, which application is incorporated herein to the extent necessary for an understanding of this aspect. In this case, the stop may, at the same time, be part of an adjusting mechanism for pushing the sealing bridge upward.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
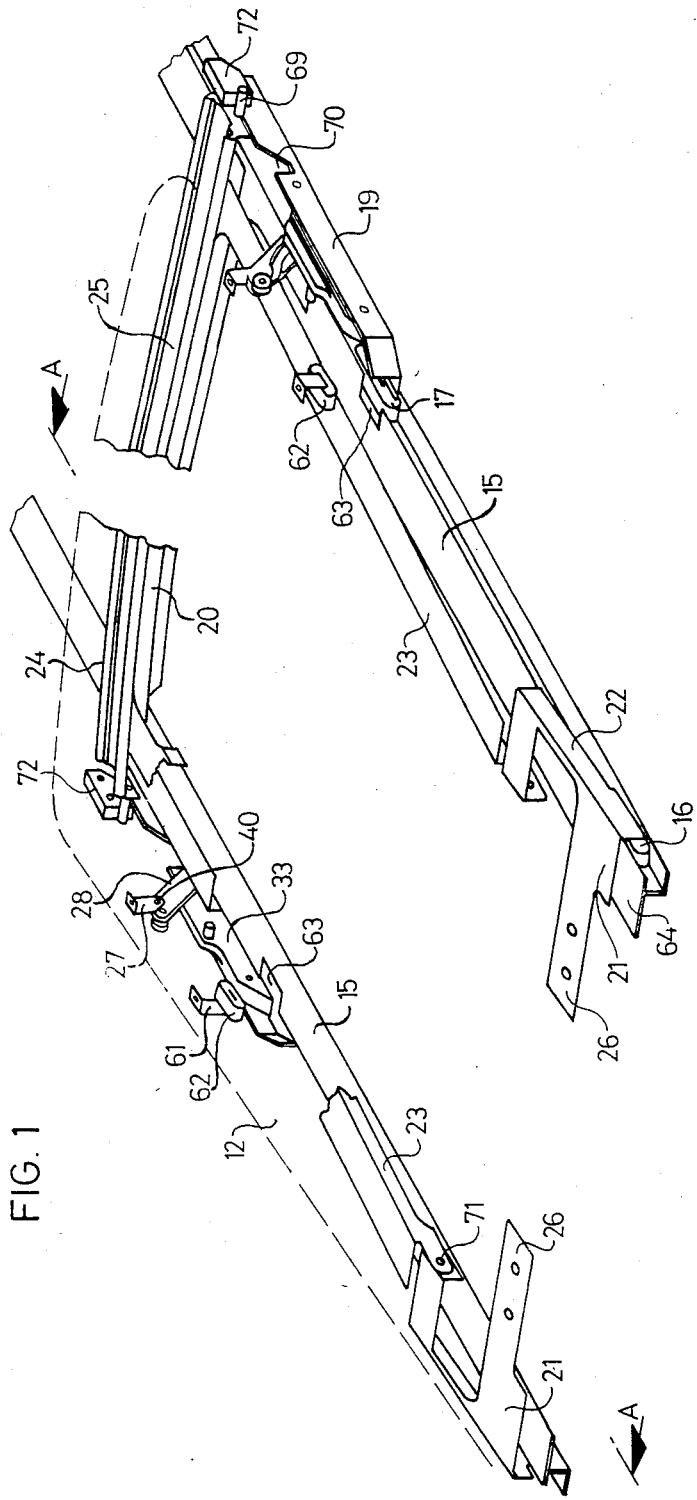
FIG. 1 shows a diagrammatic perspective view of the important functional components of the sliding/lifting roof.

As shown especially in FIGS. 1 to 4, an opening 11 in the roof is provided in a fixed area 10 of the roof, in which case, said opening 11 may be closed by means of a rigid cover 12 and may be at least partially opened by shifting of the cover 12. The roof opening 11 is encircled by a roof frame 13 which, along the front edge and at both sides of the opening in the roof, forms a rain gutter 14. At the roof frame 13, at both longitudinal sides of the opening 11 in the roof, a respective slide rail 15 is attached that extends in the longitudinal direction of the vehicle. The slide rails 15 and the other components of the sliding/lifting roof are arranged essentially in a mirror-imaged symmetrical manner with respect to a longitudinal axis of symmetry. Therefore, only the construction and the method of operation of the arrangement on one side are explained in detail in the following.

A front sliding block 16, a center sliding block 17 and a rear sliding block 18 run in the slide rail 15. The sliding blocks 17, 18 are mounted to a guide piece 19, which itself is connected with a transport bridge 20 that extends crosswise of the roof opening so that guide piece 19 itself serves as a drive member for bridge 20 and other parts connected thereto. The transport bridge 20, in the sliding direction of the cover (which corresponds to the longitudinal direction of the vehicle), can be displaced in any known way. One or several threaded cables that are resistant to pressure may, for example, be provided for this purpose, with said cables being in driving connecting with a drive motor, preferably an electric motor, or a crank.

The front sliding block 16 is mounted to a sliding block carrier 21. At the end of an arm 22 of the sliding block carrier 21, extending toward the rear, a bracket 23 is coupled which, on the rear end thereof, a sealing bridge 24 is supported. The sealing bridge 24 forms a water channel 25, located below the rear edge of the opening 11 in the roof, when the cover 12 is in one of the positions shown in FIGS. 2–4. At each side, cover 12 is fastened at one end to a side 26 of the sliding block carrier 21 and, near the other end, to an angle member 27, which itself is linked to one end of a tilt-out lever 28. In the case of the illustrated embodiment, the front sliding block 16 not only serves a sliding function, but also constitutes a pivot bearing forming a transverse pivot axis around which the cover 12 can be swung for lowering and tilting-out from the closed position. For this purpose, the sliding block 16 is made of a corresponding resiliently flexible material. However, it is understood that the cover 12 may also be hinged to the carrier of the front sliding block 16.

Figure 5:
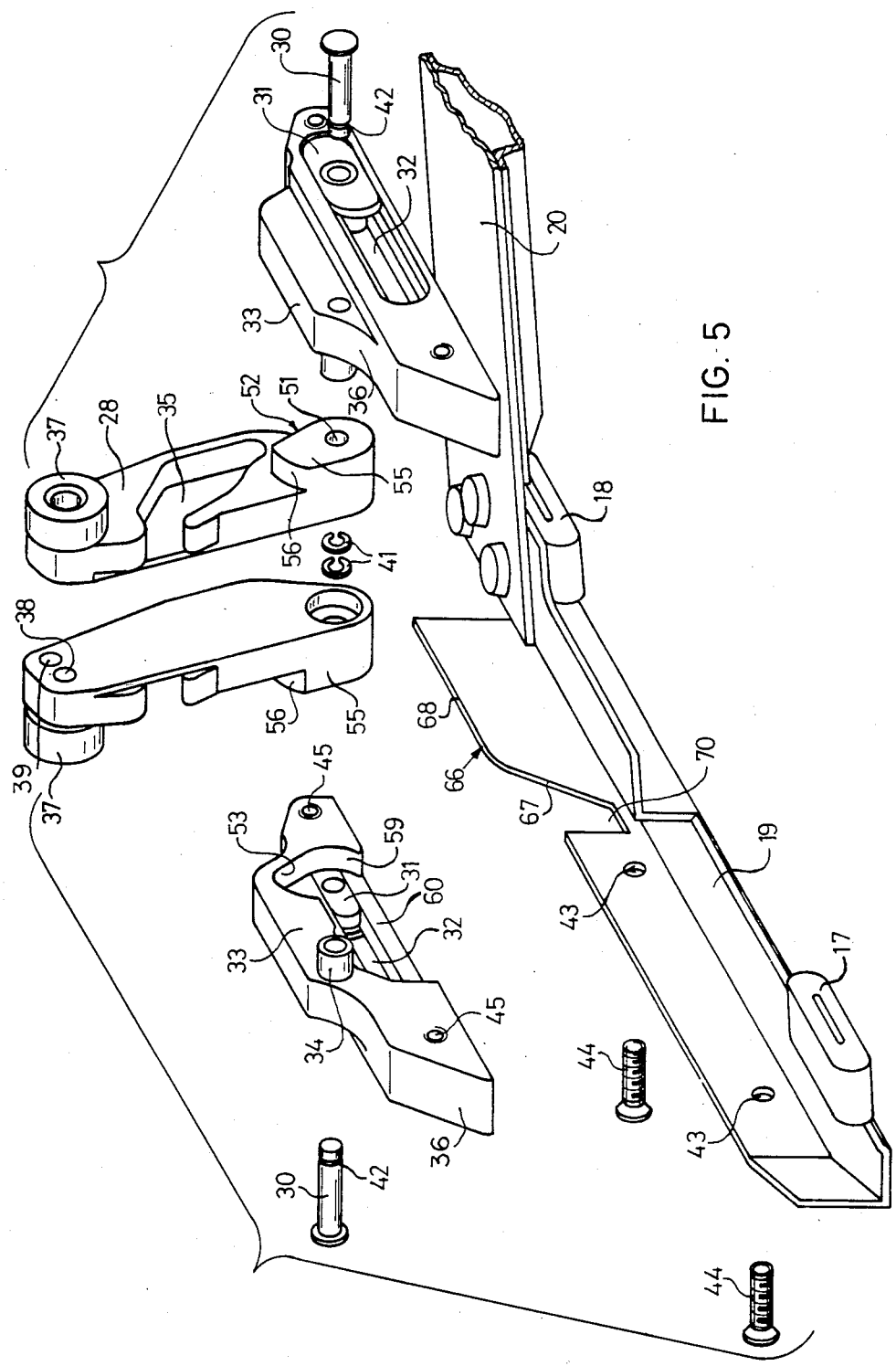
FIG. 5 shows a partially exploded, perspective representation of the left and right side links and tilt-out levers, as well as the left side part of the transport bridge.

As shown most clearly in FIG. 5, the tilt-out lever 28, via a tilt-out pin 30, is linked to a slider 31, which itself is guided so that it can be longitudinally slid in a longitudinal slot 32 of a link 33 that is firmly connected with the transport bridge 20. The link 33 has a laterally projecting link pin 34. Said link pin 34 engages in a guide slot 35 of the tilt-out lever 28. The link 33, at its part that extends forwardly, has a cam path 36 that can interact with a lowering roller 37 that acts as a cam. The lowering roller 37 is disposed so that it can be rotated around a pin 38 that is located at the end of the tilt-out lever 28 opposite that which is connected to the slider 31. Adjacent to the pin 38, there is a borehole 39 for receiving a pivot journal 40 (FIG. 1) supporting angle member 27. The lowering roller 37 is formed of an elastic material. A securing ring 41 is used for holding the tilt-out lever 28 on the tilt-out pin 30, with said securing ring 41 engaging in a ring groove 42 of the tilt-out pin 30. The connection between the transport bridge 20 and the link 33 takes place via the guide piece 19 that is provided with holes 43, through which screws 44 extend so as to engage in threaded boreholes 45 of the link 33.

The tilt-out pin 30, the slider 21 and the longitudinal slot 32 form a first forcing guide, while an additional forcing guide is formed by the link pin 34 interacting with the guide slot 35 and the lowering roller 37 in conjunction with the cam path 36. The two forcing guides provide a three-point engagement of the tilt-out lever 28 and the link 33, in which case, the arrangement is dimensioned in such a way that the components 28, 30, 31 and 33, between the operational positions of FIGS. 6–11 (i.e., when the cover is lowered, when the cover is closed, and at the start of the tilting-out process), are mutually slightly prestressed. This prestress is made possible by the elasticity of the lower roller 37, but may also be achieved by an elastic mounting of roller 37 to lever 28. Based on this initial stress, the relative movement between the tilt-out lever 28 and the link 33 in this adjusting range takes place without play. At the same time, a forced course is provided; within the whole adjusting range, the tilt-out lever 28, for every position of the link 33, with respect to the slide rail 15, is forced into a predetermined swivel position with respect to the link 33.

Figure 6:
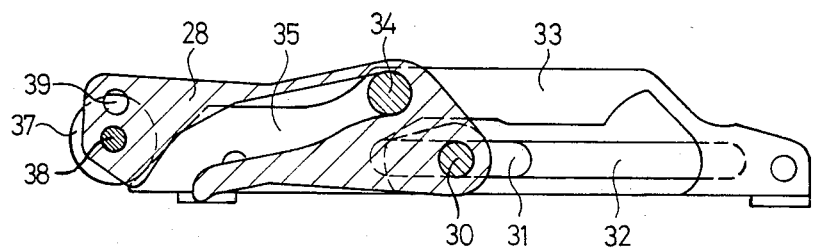
FIGS. 6–13 show the link and the tilt-out lever in various operational positions.

When the rear edge of the cover is lowered (FIG. 3), the tilt-out lever 28 and the link 33 take up the mutual position according to FIG. 6. The link 33 is positioned in such a way that the front end of the longitudinal slot 32 strikes against the front end of the slider 31. When, by means of a displacement of the transport bridge 20, the link 33 is pulled backward, with cover 12 is taken along in lowered position so as to, at least partially, unblock the opening 11 in the roof.

Figure 7:
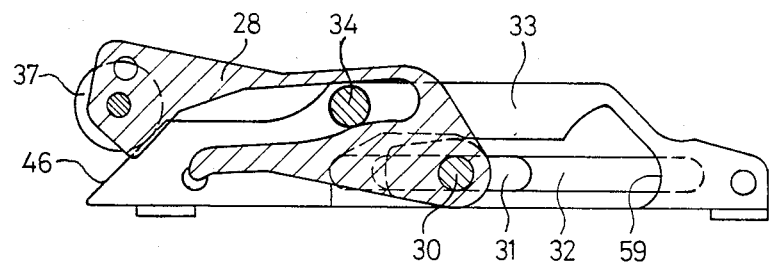

When, on the other hand, the transport bridge 20 and with it the link 33, starting from the position according to FIG. 6, is pushed toward the front into the position according to FIG. 7, the longitudinal slot 32 is advanced with respect to the slider 31, while, at the same time, the link pin 34, starting from its end position at the rear end of the guide slot 35, moves to the front, and the lowering roller 37 runs up a section 46 of the cam path 36 that slopes diagonally upward. Consequently, the tilt-out lever 28 is swivelled around the tilt-out pin 30 clockwise (FIG. 7). By means of this swivel movement, the rear edge of the cover, via the angle member 27, is pushed upward; the cover 12 carries out a swivel movement around the swivel axis determined by the front sliding blocks 16.

Figure 8:
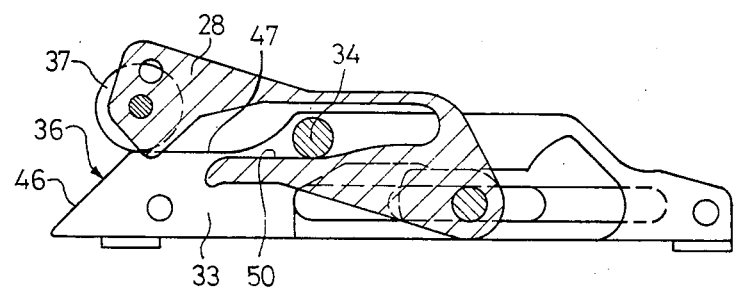

As soon as the link 33 reaches the relative position with respect to the tilt-out lever 28 according to FIG. 8, i.e., the lowering roller 37 has run up onto a section 47 of the cam path 36 that connects to section 46 and is parallel to the longitudinal range of the roof, i.e., is essentially horizontal, the cover 12 has reached its closed position (FIG. 2), where it is essentially flush with respect to the fixed area 10 of the roof. The section 47 determines an idle range. During passage through this idle range, i.e., during the transition of the link 33 from the position according to FIG. 8 into the position according to FIG. 9, the swivel position of the tilt-out lever 28 is kept constant irrespective of the longitudinal movement of the link. Especially an upward swing of the tilt-out lever 28 is prevented by the fact that the link pin 34 rests against a guiding surface 50 of the tilt-out lever 28, which, during the passage through the idle range, is essentially parallel to section 47 of the cam path 36. Thus, in this range, longitudinal shifting of the link 33 has no influence on the position of the cover 12. The described idle range has the advantage that, when the sliding/lifting roof is moved, in the range of the closed position of the cover, considerable tolerances may be permitted without having a disturbing influence. If, for example, an existing electric drive motor is switched off in the relative position according to FIG. 8, and it should run-on briefly before stopping, it will not have an adverse effect. The switch-off time also may be shifted within considerable tolerances without having any disadvantageous effects.

Figure 9:
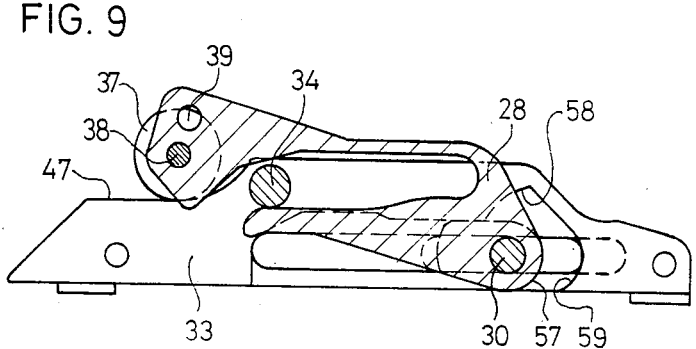
Figure 10:
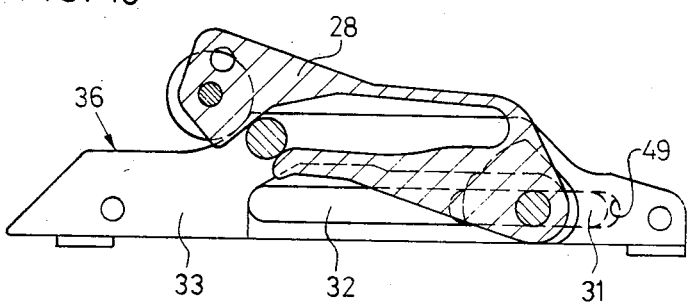
Figure 11:
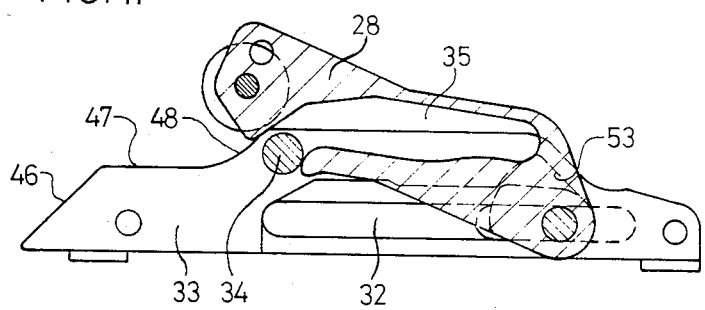

When the link 33 is moved along from the position according to FIG. 9, via the position according to FIG. 10, into the relative position according to FIG. 11, the lowering roller 37 runs up a sloped section 48 of the cam path 36 that is connected to section 47, while the link pin 34 comes out of the guide slot 35, and the cover 12 starts its tilt-out movement.

Figure 12:
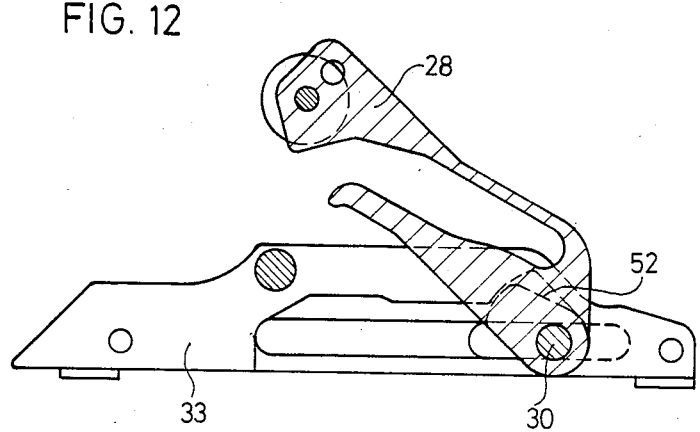
Figure 13:
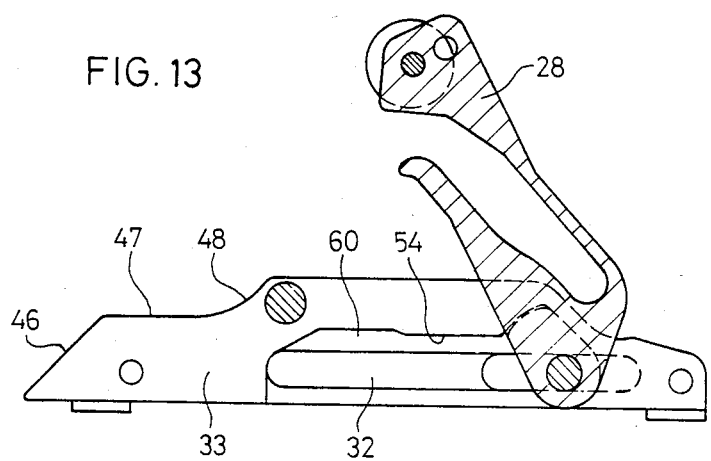

During the link movement between the relative positions of FIGS. 6 and 11, the tilt-out lever 28 has carried out a pure rotating movement around the axis of the tilt-out pin 30, i.e., the tilt-out pin 30 holds a fixed relative position with respect to the slide rail 15 during the relative movement of lever 28. When now, starting from the position according to FIG. 11, the link 33, via the transport bridge 20, is pushed further to the front, a cylindrical contact surface 59 of the link 33 will rest against a cylindrical contact surface 57 of the tilt-out lever 28 (surfaces 57 and 59 being shown most clearly in FIG. 9). The lower end of the tilt-out lever 28 is taken along by the link 33 so that the axis of the tilt-out pin 30, with respect to the slide rail 15, moves further to the front. The end of tilt-out lever 28 coupled to the angle member 27, thus, moves upward as shown in FIGS. 12 and 13. The cover is tilted out according to FIG. 4.

In proximity of an opening 51 receiving the tilt-out pin 30, the tilt-out lever 28 has a stop face 52 which, in the operating position according to FIG. 13, rests against a stop face 53 of the link 33 and thus limits the swing-out movement of the tilt-out lever 28 with respect to the link 33. During the sliding of the link 33 from the position corresponding to approximately that of FIG. 8 into the position according to FIG. 10, the stop face 52, with play, is shifted with respect to a surface 54 of the link 33, extending parallel to the longitudinal direction of the slot 32. If, for example, in the case of an attempt to break in, the cover 12 is lifted by force and the link pin 34 is torn off, the stop face 52 will rest against the surface 54 so that a swinging-out of the cover is prevented. In this manner, the surfaces 52, 54 form an additional safety aspect.

The stop face 52 is formed by a laterally protruding projection 55, which, at its front end, is limited by a cylindrical contact surface 56, which borders on the straight contact surface 52 and the center of curvature of which coincides with the axis of the tilt-out pin 30. The cylindrical contact surface 57 is diametrically opposite the cylindrical contact surface 56, with the cylindrical contact surface 57 also being concentric with respect to the axis of the tilt-out pin 30. During the tilting-out movement, i.e., during the swinging of the tilt-out lever 28 from the position according to FIG. 11 into the position according to FIG. 13, the cylindrical contact surfaces 56, 57 of the tilt-out lever 28 interact with a cylindrical contact surface 58 or the contact surface 59 of a recess 60 of the link 33 receiving the projection 55 (see FIG. 9). When the slider 31 abuts at the rear end of the longitudinal slot 32, the contact surfaces 58, 59 also extend concentrically with respect to the axis of the tilt-out pin 30. In this manner, additional, large-surface bearing surfaces are obtained for the tilting-out movement of the tilt-out lever 28.

Figure 2:
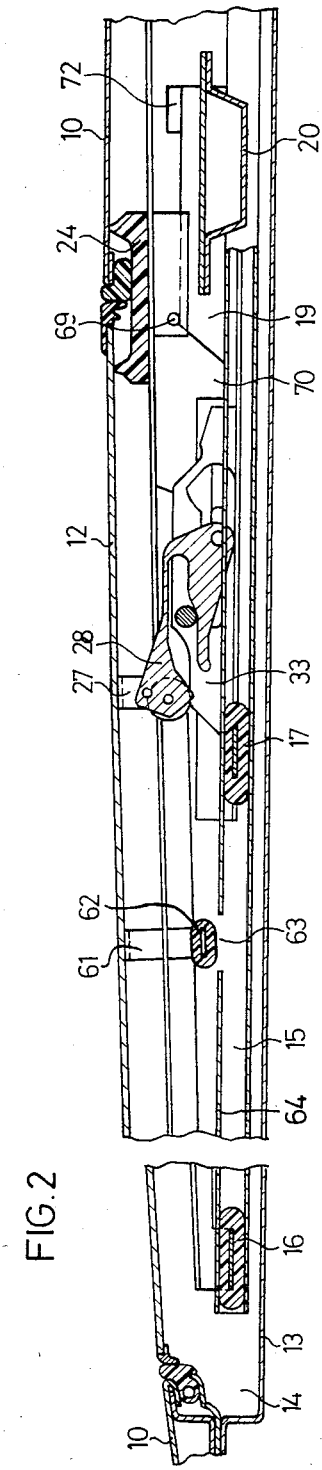
FIG. 2 shows a longitudinal cut through a sliding-/lifting roof corresponding to Line A—A of FIG. 1, with the cover being in a closed position.
Figure 3:
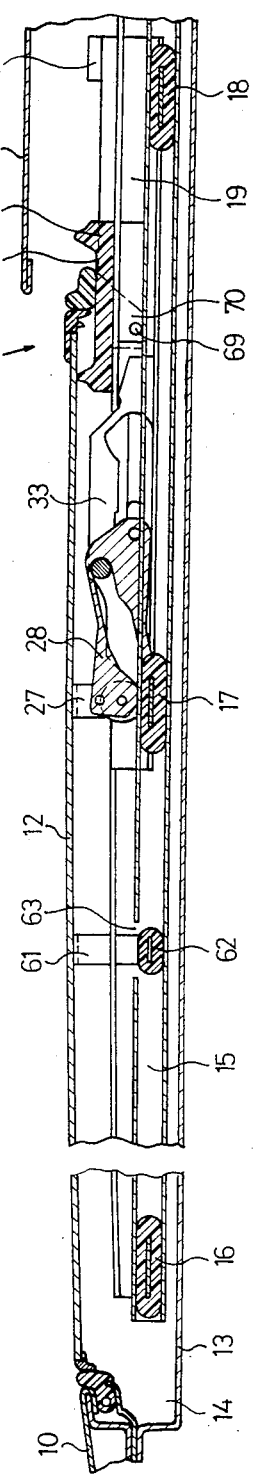
FIG. 3 shows a longitudinal cut corresponding to FIG. 2, with the rear edge of the cover being lowered.
Figure 4:
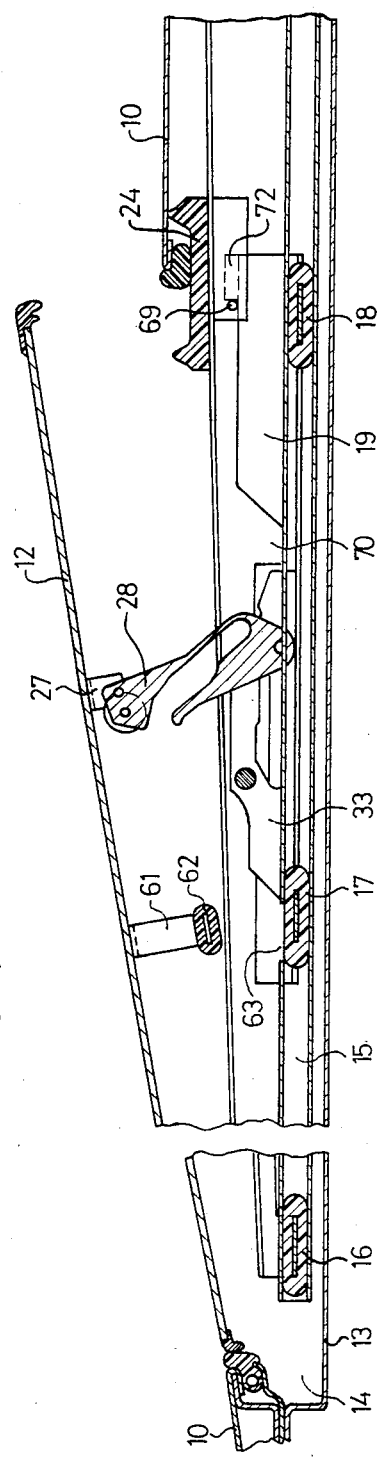
FIG. 4 shows a longitudinal cut corresponding to FIG. 2, with the rear edge of the cover being tilted out.

A holding-down device 62 is mounted at the underside of the cover 12, via an angle bracket 61, with said holding-down device 62, just like the sliding blocks 16, 17 and 18 running in the slide rail 15, while the cover 12 is moved between its fully pushed-back position that unblocks the opening 11 in the roof and a position shortly before reaching the position according to FIG. 3. This prevents an undesired swivel movement of the cover 12 in this sliding phase. When the cover 12 reaches its front end position (FIG. 3), the holding-down device 62 will be located below a recess 63 in the upper web 64 of the slide rail 15. When now, the cover 12, by a further pushing-forward of the link 33, is lifted with its rear edge by means of the tilt-out lever 28, the holding-down device 62, via the recess 63, comes out of the slide rail 15 (FIGS. 1, 2 and 4).

A cam path 66 (FIG. 5) is developed at the guide piece 19 connected with the transport bridge 20, with said cam path 66 having a section 67 that diagonally slopes upward toward the rear and having a section 68 that connects to said section 67, with the section 68 extending in parallel to the longitudinal direction of the slide rail 15. Projecting laterally from bridge 24 is a stop 69 which interacts with the cam path 66. During the longitudinal sliding of the cover 12, the stop 69 dips into a recess 70 of the guide piece 19 and the sealing bridge 24 is lowered (FIG. 3). When the rear edge of the cover is swung upward from the lowered position according to FIG. 3 into the closed position according to FIG. 2, the rising section 67 of the cam path 66 slides under the stop 69 so that the stop 69 is moved upward. The sealing bridge 24 is swung upward around a joint 71 connecting the bracket arm 23 with the arm 72 of the sliding block carrier 21 (FIG. 1). During the transition of the cover from the closed position of FIG. 2 into the tilted-out position of FIG. 4, the sealing bridge 24, by means of the interaction of the stop 69 with section 68 of the cam path 66, is pressed upward so that penetration of water into the inside of the vehicle is safely avoided. Water that is caught by the water groove 25 of the sealing bridge 24 is drained off to the side in a manner that is not described in detail.

When the link 33 has reached its front end position and the cover 12 is fully swung out (FIGS. 1 and 4), a counterstop 72, that is firmly connected with the guide piece 19, will rest against the stop 69 from behind, with said counterstop 72 preventing an unintentional pushing-back of the tilted-out cover 12.

The described arrangement guarantees that a longitudinal movement of the cover 12 in all positions of the cover, with the exception of the fully lowered position (FIG. 3) is impossible, and that, during the sliding of the lowered cover, there is no vertical movement (vertical swivel) of the cover. The mechanism, in the range of the closed position of the cover, is tight and without play. An inertia-caused running-after of a drive motor after the switch-off in the range of the closed position of the cover is neutralized. By means of the discussed forced guidance, a certain position of the tilt-out lever is clearly assigned to each position of the link. During the swivel movement of the cover, the swivel shaft of the cover is held stationary with respect to the vehicle. A longitudinal movement of the cover is with the use of the greatest force neither possible in the case of the partly tilted-out, nor in the case of the fully tilted-out cover. The tilt-out lever and the cover always carry out a pure rotating movement with respect to one another. During the tilting-out of the cover, the tilt-out lever is also, with respect to the link, caused to only carry out a pure rotating movement, in the course of which there is surface contact between the link and the tilt-out lever.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A slidable and liftable roof assembly for vehicles, especially motor vehicles, having a rigid cover closing an opening in the roof in a closed position, said rigid cover, in an area of its front edge at each longitudinal side of the opening in the roof, being guided for displacement in a sliding manner, by means of a respective guiding member, in a longitudinal guide, being pivotable around an axis extending transversely to a cover sliding direction, and being connected, in an area located at a distance from the front edge of the cover toward the rear of the cover, to a tilt-out mechanism; a drive member that is displaceable in the cover sliding direction being connected to the tilt-out mechanism so that the rigid cover is selectively swingable out of the roof opening by a lifting of its rear edge above the fixed roof surface, and being selectively slidable, after a lowering of its rear edge to a position below a fixed roof surface; and wherein the tilt-out mechanism has a link that is shiftable jointly with said drive member, and has, at each side of the roof opening, a single tilt-out lever that engages with said link, said tilt-out lever being pivoted to said cover at one end so that it rotates around a shaft fixed at said cover and at an opposite end being longitudinally movable relative to said link for a distance in the sliding direction of said cover and also being swingable, characterized in that the link and the tilt-out lever, via a forcing guide means, are connected with one another, with said forcing guide means, at least in a range of the cover displacement between the closed position of the cover and said position at which the rear edge of the cover is lowered below the fixed roof surface, positively guiding the tilt-out lever into a predetermined swing position with respect to the link for every position of the link with respect to the longitudinal guide.

2. A roof assembly according to claim 1, wherein the forcing guide means is operable to force the tilt-out lever to carry out a swinging movement with respect to the link that takes along the rear edge of the cover into the lowered position.

3. A roof assembly according to claim 1, wherein the forcing guide means has an idle range, which is operative when the cover is in the vicinity of its closed position and within which the forcing guide means acts to hold the position of the tilt-out lever constant, with respect to the link irrespective of longitudinal movement of the link.

4. A roof assembly according to claim 3, wherein the forcing guide means is comprised of a link pin fastened to the link and engaging in a guide slot of the tilt-out lever as well as by a cam mounted to the tilt-out lever and slideable along a cam path of the link.

5. A roof assembly according to claim 4, wherein the cam is elastic for creating a mutual prestressing that eliminates play between the link and the tilt-out lever.

6. A roof assembly according to claim 5, wherein the cam is a roller that is made of an elastic material and is rotatably disposed on the tilt-out lever.

7. A roof assembly according to claim 1, wherein the forcing guide means is comprised of a link pin fastened to the link and engaging in a guide slot of the tilt-out lever as well as by a cam mounted to the tilt-out lever and slideable along a cam path of the link.

8. A roof assembly according to claim 7, wherein at least one of the cam and the mounting thereof to the tilt-out lever is elastic for creating a mutual prestressing that eliminates play between the link and the tilt-out lever.

9. A roof assembly according to claim 8, wherein the cam is a roller that is made of an elastic material and is rotatably disposed on the tilt-out lever.

10. A roof assembly according to claim 4, wherein the link has a longitudinal slot in which a slider is guided so that it can be slid in the cover sliding direction, and wherein the tilt-out lever is coupled to said slider.

11. A roof assembly according to claim 1, wherein the link has a longitudinal slot in which a slider is guided so that it can be slid in the cover sliding direction, and wherein the tilt-out lever is coupled to said slider.

12. A roof assembly according to claim 10, wherein the link and the tilt-out lever have stop faces that interact with one another for limiting the tilting-out movement of the tilt-out lever with respect to the link.

13. A roof assembly according to claim 1, wherein the link and the tilt-out lever have stop faces that interact with one another for limiting the tilting-out movement of the tilt-out lever with respect to the link.

14. A roof assembly according to claim 13, wherein the link and the tilt-out lever have complementary contact surfaces for guiding the tilt-out lever during the tilting-out process.

15. A roof assembly according to claim 12, wherein the link and the tilt-out lever have complementary contact surfaces for guiding the tilt-out lever during the tilting-out process.

16. A roof assembly according to claim 1, wherein the link and the tilt-out lever have complementary contact surfaces for guiding the tilt-out lever during the tilting-out process.

17. A roof assembly according to claim 3, wherein the link and the tilt-out lever have interacting guide parts for preventing an upward swinging of the tilt-out lever when the idle range of the forcing guide means is operative.

18. A roof assembly according to claim 10, wherein the link and the tilt-out lever have interacting guide parts for preventing an upward swinging of the tilt-out lever when the idle range of the forcing guide means is operative.

19. A roof assembly according to claim 12, wherein the link and the tilt-out lever have interacting guide parts for preventing an upward swinging of the tilt-out lever when the idle range of the forcing guide means is operative.

20. A roof assembly according to claim 14, wherein the stop faces and the contact surfaces are formed by a lateral projection of the tilt-out lever that is provided in an area of a coupling point of the tilt-out lever to the link, and by a recess in the link receiving said projection.

21. A roof assembly according to claim 1, wherein, at both sides of the cover, a holding-down device is provided that interacts with the longitudinal guide during sliding displacement of the cover, and disengages from the longitudinal guide during the tilting-out of the cover.

22. A roof assembly according to claim 1, further comprising a stop that moves jointly with the longitudinal movement of the cover and, in the tilted-out position of the cover, rests against a counterstop for preventing a longitudinal movement of the cover.

23. A roof assembly according to claim 22, wherein the stop is mounted on a sealing bridge that is longitudinally shiftable with the cover, with said sealing bridge forming a water channel and being operative for being located below the rear edge of the cover and for being pressed, in the closed position of the cover, from below, against at least one of the underside of the cover and the fixed rear roof surface.

24. A roof assembly according to claim 23, wherein the stop forms part of an adjusting mechanism for pressing the sealing bridge upward.

25. In a roof assembly of the type wherein a rigid cover is slideably displaceable between positions closing and opening an opening in the roof of a vehicle, and is displaceable by a tilt-out mechanism in a pivotable manner, from the closed position, about a transverse axis disposed in the vicinity of a front edge of the panel, upwardly to a first position and downwardly to a second position and having the improvement for providing stable guidance and suppression of tendencies to vibrate and rattle, comprising said tilt-out mechanism having, at each side of the roof opening, a single tilt-out lever, that is pivotally connected to the cover, a link that is displaceable in the sliding direction of the cover and is connected to the tilt-out lever in a manner permitting relative pivoting and sliding motions therebetween, and a forcing guide means, that is operative at least in a range of movements of said cover from said closed position to said second position, for creating a three-point interconnection between the tilt-out lever and the link that eliminates play between the link and the tilt-out lever.

26. A roof assembly according to claim 25, wherein the forcing guide means has an idle range, which is operative when the cover is in the vicinity of its closed position and during the passage of which the swivel position of the tilt-out lever, with respect to the link, is kept constant irrespective of longitudinal movement of the link.

27. A roof assembly according to claim 25, wherein the forcing guide means is comprised of a link pin fastened to the link and engaging in a guide slot of the tilt-out lever as well as by a cam mounted to the tilt-out lever and slideable along a cam path of the link.

28. A roof assembly according to claim 27, wherein the the cam is a roller that is made of an elastic material and is rotatably disposed on the tilt-out lever.

* * * * *